US012600080B2

(12) United States Patent
Savino et al.

(10) Patent No.: US 12,600,080 B2
(45) Date of Patent: Apr. 14, 2026

(54) DIGITAL PRINTED 3-D PATTERNED EMBLEM WITH GRAPHICS FOR SOFT GOODS

(71) Applicant: Avery Dennison Retail Information Services LLC, Mentor, OH (US)

(72) Inventors: Dave Savino, Glen Burnie, MD (US); Owen McGovern, Columbia, MD (US); Gillian Ross, Ellicott City, MD (US); Stephen Mynott, Towson, MD (US); Paul Weedlun, Fulton, MD (US)

(73) Assignee: Avery Dennison Retail Information Services LLC, Mentor, OH (US)

( * ) Notice: Subject to any disclaimer, the term of this patent is extended or adjusted under 35 U.S.C. 154(b) by 669 days.

(21) Appl. No.: 17/347,008

(22) Filed: Jun. 14, 2021

(65) Prior Publication Data

US 2021/0394430 A1 Dec. 23, 2021

Related U.S. Application Data

(60) Provisional application No. 63/040,420, filed on Jun. 17, 2020.

(51) Int. Cl.
| | |
|---|---|
| *B29C 59/02* | (2006.01) |
| *B29C 59/00* | (2006.01) |
| *B29C 65/00* | (2006.01) |
| *B29C 65/48* | (2006.01) |
| *B29K 101/12* | (2006.01) |
| *B29K 675/00* | (2006.01) |
| *B41M 5/00* | (2006.01) |
| *B41M 7/00* | (2006.01) |
| *B29L 31/00* | (2006.01) |

(52) U.S. Cl.
CPC .......... B29C 59/026 (2013.01); B29C 59/005 (2013.01); B29C 65/48 (2013.01); B29C 66/727 (2013.01); B29C 66/7392 (2013.01); B41M 5/0047 (2013.01); B41M 5/0064 (2013.01); B41M 7/0027 (2013.01); B29C 2795/002 (2013.01); B29K 2101/12 (2013.01); B29K 2675/00 (2013.01); B29L 2031/722 (2013.01)

(58) Field of Classification Search
CPC ..... B29C 59/026; B29C 59/005; B29C 65/48; B29C 66/727; B29C 66/7392; B29C 2795/002; B41M 5/0047; B41M 5/0064; B41M 7/0027; B41M 5/0041; B41M 7/00; B29K 2101/12; B29K 2675/00; B29L 2031/722

See application file for complete search history.

(56) References Cited

U.S. PATENT DOCUMENTS

| | | | |
|---|---|---|---|
| 3,298,710 A | 1/1967 | Willetts | |
| 4,086,379 A | 4/1978 | Brown | |
| 5,264,279 A | 11/1993 | Imamura et al. | |
| 5,599,416 A | 2/1997 | Kuwahara | |
| 6,290,798 B1 | 9/2001 | Onishi et al. | |
| 6,309,582 B1 | 10/2001 | Wu | |
| 6,423,406 B1 | 7/2002 | Bilodeau | |
| 6,701,652 B1 | 3/2004 | Serigraph | |
| 8,236,122 B2 | 8/2012 | Kronzer | |
| 2001/0025687 A1 | 10/2001 | Cross | |
| 2002/0195005 A1 | 12/2002 | Oshima et al. | |
| 2005/0245651 A1 | 11/2005 | Cooper | |
| 2007/0172610 A1 | 7/2007 | Williams | |
| 2007/0178295 A1* | 8/2007 | Haas ...................... B42D 25/46 428/318.4 |
| 2009/0160087 A1* | 6/2009 | Yang ................. B29C 45/14827 264/271.1 |
| 2009/0176039 A1 | 7/2009 | af Strom | |
| 2014/0093707 A1 | 4/2014 | Kaufmann | |
| 2015/0122410 A1 | 5/2015 | Tanrikulu et al. | |
| 2016/0052256 A1 | 2/2016 | Rumsey | |
| 2016/0089852 A1* | 3/2016 | Lindenfelzer ......... B32B 27/308 428/315.7 |
| 2019/0118575 A1 | 4/2019 | McGovern et al. | |
| 2020/0238601 A1 | 7/2020 | Pachaly et al. | |

FOREIGN PATENT DOCUMENTS

| | | |
|---|---|---|
| JP | 5172598 | 3/2013 |
| WO | 2016/044547 | 3/2016 |
| WO | 2016/196267 | 12/2016 |
| WO | 2017/044735 | 3/2017 |
| WO | 2019/063094 | 4/2019 |

* cited by examiner

*Primary Examiner* — Nathan L Van Sell

(57) ABSTRACT

A multidimensional heat-seal emblem having a digitally-printed image on one side in registration to a three-dimensional relief profile. The emblem has enhanced aesthetic impact, flex, stretch, durability and is suitable for soft goods. A method of production is also disclosed that provides 0.05 mm level relief detail with high profile features up to 6 mm in height.

16 Claims, 3 Drawing Sheets

Figure 6:
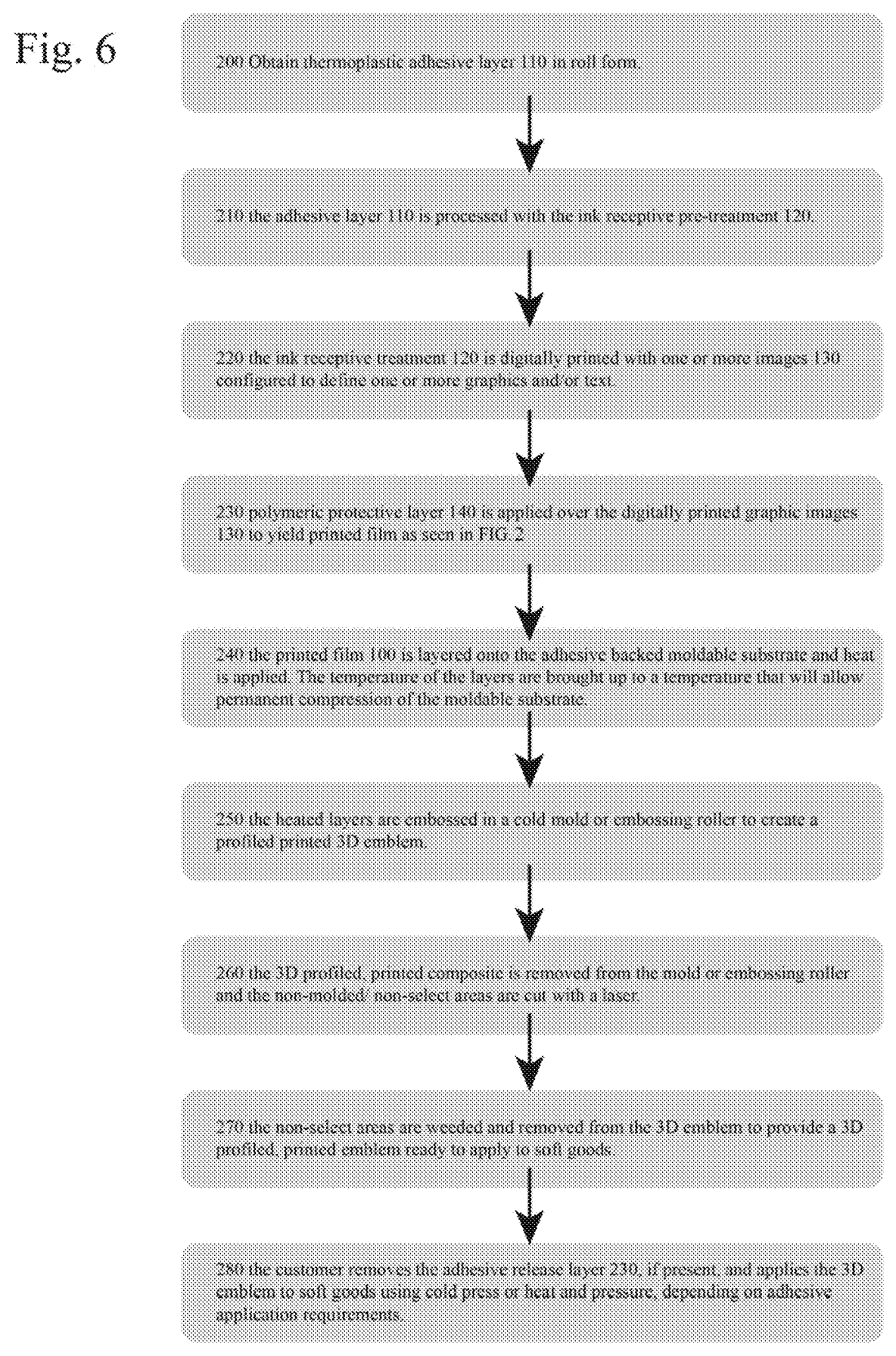

200) Obtain thermoplastic adhesive layer 110 in roll form.

↓

210 the adhesive layer 110 is processed with the ink receptive pre-treatment 120.

↓

220 the ink receptive treatment 120 is digitally printed with one or more images 130 configured to define one or more graphics and/or text.

↓

230 polymeric protective layer 140 is applied over the digitally printed graphic images 130 to yield printed film as seen in FIG. 2

↓

240 the printed film 100 is layered onto the adhesive backed moldable substrate and heat is applied. The temperature of the layers are brought up to a temperature that will allow permanent compression of the moldable substrate.

↓

250 the heated layers are embossed in a cold mold or embossing roller to create a profiled printed 3D emblem.

↓

260 the 3D profiled, printed composite is removed from the mold or embossing roller and the non-molded/ non-select areas are cut with a laser.

↓

270 the non-select areas are weeded and removed from the 3D emblem to provide a 3D profiled, printed emblem ready to apply to soft goods.

↓

280 the customer removes the adhesive release layer 230, if present, and applies the 3D emblem to soft goods using cold press or heat and pressure, depending on adhesive application requirements.

DIGITAL PRINTED 3-D PATTERNED EMBLEM WITH GRAPHICS FOR SOFT GOODS

CROSS-REFERENCE TO RELATED APPLICATIONS

The present application derives priority from U.S. Provisional Patent Application 63/040,420 filed 17 Jun. 2020, and U.S. patent application Ser. No. 16/166,457 filed Oct. 22, 2018.

BACKGROUND OF THE INVENTION

1. Field of the Invention

The present invention relates to 3D patterned emblems and, particularly, to digital inkjet or laser printed images, embossed in registration to create 3D patterned and or textured emblems comprised of numbers, letters, logos, graphics, and other indicia for use with soft goods.

2. Description of the Background 3D patterned emblems with graphical content, such as text or a figure have become increasingly popular in apparel and merchandise to provide an impactful decoration. The 3D patterned emblem is usually created using a mold to create the profile, and the graphic associated with the profile is usually printed or applied onto the profiled object. In some instances the mold is used in conjunction with ultrasonic welding or induction heating to permanently form the material to the profiled shape of the mold. Then the printed graphic is applied to the profiled part and the whole emblem can be applied to the soft goods. In another approach layering different colored materials creates the graphic within the mold, after curing this can be applied to the soft goods. Typical methods for creating 3D emblems include the following:

1) Multilayer silicone molding to provide variety in color and shape during the molding process, e.g. Japan patent JP5172598 to Kinzu et al. issued 27 Mar. 2013.
2) Embossing material to achieve the profile as described in U.S. Pat. No. 6,701,652 to McElhatton et al. (Serigraph) issued 9 Mar. 2004. Here the printed image is encapsulated in transparent layers that are deformed in a mold to provide the 3D effect. Other patents referring to the embossing method are U.S. Pat. No. 5,599,416A to Kuwahara and U.S. Pat. No. 6,309,582 to Wu. These both refer to using induction heating to heat and allow forming of a film with other layers to a mold to provide a 3D effect.
3) Creation of silicone 3D parts by additive manufacturing is described in PCT application WO2019063094A1 filed by Wacker Chemie AG, PCT application nos. WO2017044735A1 and WO2016044547A1 filed by Dow Corning Corporation. These patents are not specifically referring to emblems for apparel, but do provide a method to create 3D goods.

To apply the 3D emblem to the soft goods, either molding onto the soft good directly is required, or the addition of adhesive is required. In the latter case the adhesive side of the emblem is placed directly on the soft goods and heat and pressure are generally applied to promote adhesion. The '582 and '416 embossed patents by Wu and Kuwahara, respectively, both specify using induction heating to heat the emblem material to enable the formation of the profile of the mold. In both cases a heat deformable synthetic resin, such as polyurethane or PVC is layered with a metal layer. The induction heat directly heats this metal layer which allows local heating of the plastic layer(s), which in turn melt/flow into the form of the mold. To ensure that the mold profile is retained, subsequent heating steps must occur below the temperature at which this synthetic resin material melt flows. As the profile and texture is formed in this resin layer, any detail required in the profile is restricted to the height of the resin material. In these patents other layers have been suggested as an addition to this heat deformable resin layer, however any profile obtained is held within the resin layer. To simultaneously achieve large-profile height differences and high dimensional detail, thick and dense resin layers are required which results in a stiff emblem. When a large continuous emblem on lightweight soft goods is required, a stiff emblem will significantly reduce garment drape and user comfort. Products produced using the methods discussed above are generally rigid and have minimal pliability.

Inks and toners can be digitally printed by a variety of methods including static discharge or ink jet printing. Thus, printing techniques such as gravure printing, offset printing, flexographic printing, screen printing and digital printing all can be used to create the graphic for the emblem. Some methods of creating the 3D emblems provide graphics that are constrained by detail and color and take multiple passes (e.g. multilayer silicone molding) or require multiple layers of a thick stiff coating to encapsulate a crosslinked print (e.g. serigraph method). Lacking in the current marketplace is a product that can provide high dimensional detail (0.05 mm level variations) in combination with a high depth profile up to 6 mm, with dimensional relief details being in register with printed graphics, all in a flexible, stretchable and durable emblem. As the apparel industry moves to increasingly lightweight garments with a focus on comfort and formability while desiring 3D emblems with high dimensional relief details, a void in the market has appeared.

There is a need for lightweight, flexible, stretchable emblems that provide a 3D profile in register with a detailed print graphic to provide desired aesthetic impact. The present invention can fill this gap in the current emblem market while also providing durability. The invention can withstand stretching and multiple wash and dry cycles. It is important to note that the stretch is fully recoverable without degradation to the emblem.

Another aspect of the present invention is the reduced use of environmentally damaging chemicals. Typical screen manufacturing processes and 3D molding processes have been highly reliant on environmentally damaging chemicals and the products contain silicone or poly(vinyl) chloride (PVC), the former is not easily recycled and the latter contains toxins. Increasingly, customers and brands see value in reducing the environmental impact of their products and supply chains.

SUMMARY OF THE INVENTION

It is, therefore, an object of the present invention to provide a flexible, stretchable, durable, color graphical 3D emblem and method of manufacture, to meet the needs of the market for a multidimensional emblem with enhanced aesthetic impact, suitable for soft goods. It is also the object of this invention to reduce the use of solvents and other environmentally damaging chemicals in manufacturing of the emblem to reduce the environmental impact of the process.

In the present invention the aforementioned product can be produced by the following process.

1) Laser printing or inkjet printing onto one side of a flexible film;

2) using a mold to emboss the flexible film where the non-printed face is in combination with an adhesive backed, high stretch, moldable substrate;

3) laser cutting the composite in register with the print to separate undesired areas for easy removal.

A variation of this method would be to use an unprinted decorative flexible film, or emboss the high stretch moldable substrate with no top film surface, or a combination of both methods. Also claimed are some forms of a 3D product generated through either of these methods.

The method replaces the conventional processes, which provide emblems with less flexibility and stretch performance, and do not provide the combination of 0.05 mm level detail with high profile features (up to 6 mm in height) that can be achieved with the claimed process and resultant product.

BRIEF DESCRIPTION OF THE DRAWINGS

Other objects, features, and advantages of the present invention will become more apparent from the following detailed description of the preferred embodiment and certain modifications thereof, in which.

To apply the emblem 200 to soft goods, release layer 230 it is removed from the adhesive 220 and the emblem 200 is applied using pressure and temperature.

FIG. 6 is a block diagram of an embodiment of the present method to create the 3D profiled flexible digitally printed emblem 200.

To demonstrate the stretch differences, an emblem currently available in the market was compared with the current invention. The emblems were loaded into a tensile tester individually and a tensile stress applied at a rate of 100 mm/min. The emblem currently available in the market had a much higher Young's modulus and ruptured at low strain rates. The current invention had a much lower Young's modulus and underwent double the strain before we stopped the test. This test was repeated two more times on the same sample, the Young's modulus remained the same and the sample did not break, but returned to the original shape and size after removal of the tensile force.

DETAILED DESCRIPTION OF THE PREFERRED EMBODIMENTS

Generally, a method to provide a flexible, stretchable, color graphical 3D emblem with a high resolution dimensional profile that can be applied to soft goods is presented. The method disclosed herein replaces the conventional processes of injection molding and those that require multiple passes of material laydown to provide the colored and profiled emblem product.

For purposes of this disclosure "emboss" is herein defined as to mold or stamp a three-dimensional relief pattern on a surface.

Figures 1, 2, 3:
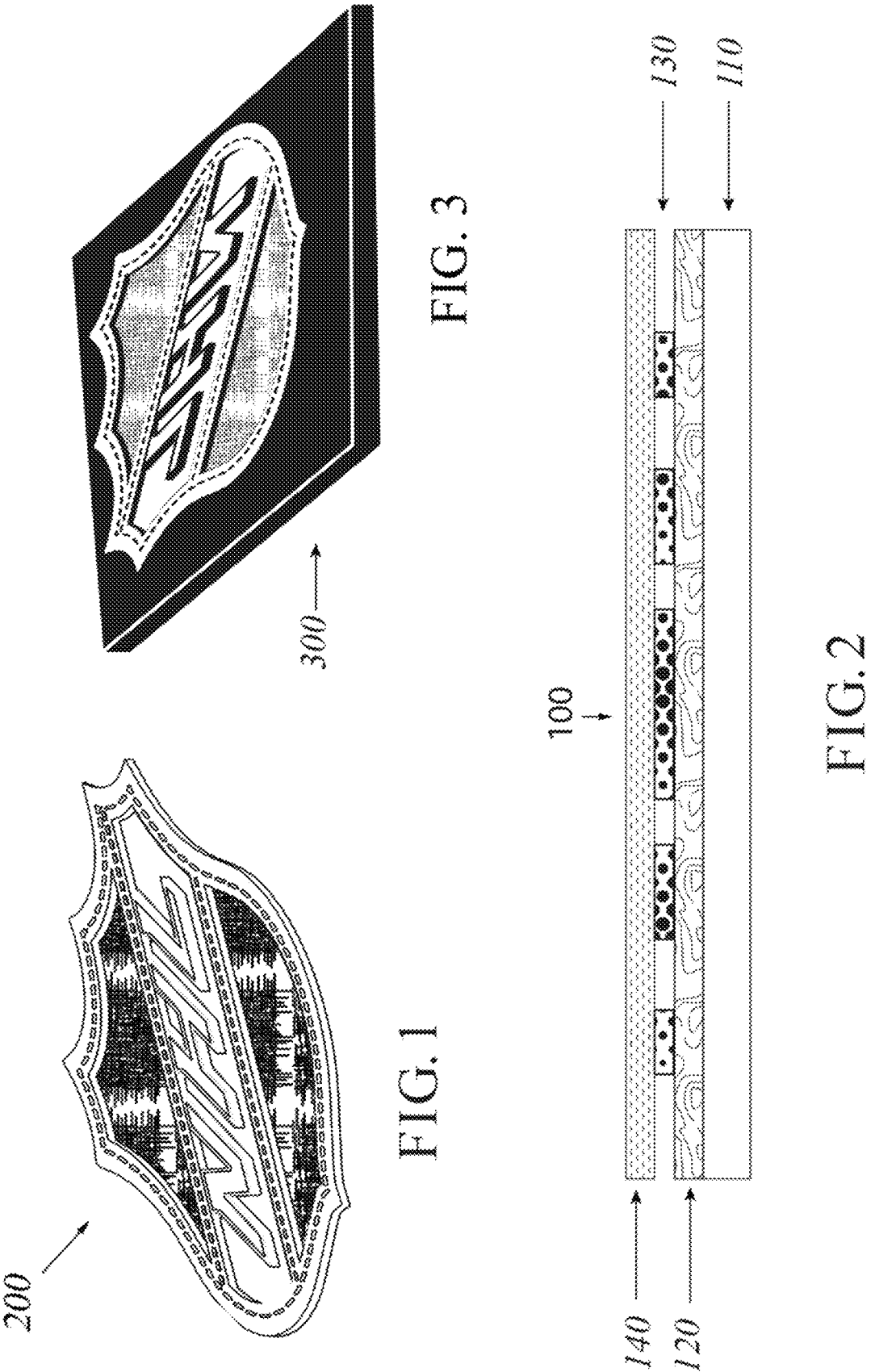
FIG. 1 is a front perspective view of a 3D-profiled flexible digitally printed emblem 200 according to an embodiment of the invention.
FIG. 2 is a cross section showing a digitally printed film 100 used in the manufacture of emblem 200.
FIG. 3 is a mold 300 used in the manufacture of emblem 200 to provide the dimensional shape of the profiled 3D emblem.

FIG. 1 is a front perspective view of a 3D-profiled flexible digitally printed emblem 200 according to an embodiment of the invention. The emblem 200 has increased dimensional detail down to 0.05 mm level variation, and a deeper depth profile up to 6 mm, with all dimensional relief details being registered to printed graphics for enhanced aesthetic impact. Moreover, the emblem 200 is lightweight, flexible, stretchable and durable. The stretch is fully recoverable without degradation to the emblem 200. Consequently, the emblem 200 can withstand frequent stretching and multiple wash and dry cycles. Moreover, the present method is environmentally friendly and the emblem 200 is not based on silicone or poly(vinyl) chloride (PVC) materials.

Figures 4, 5:
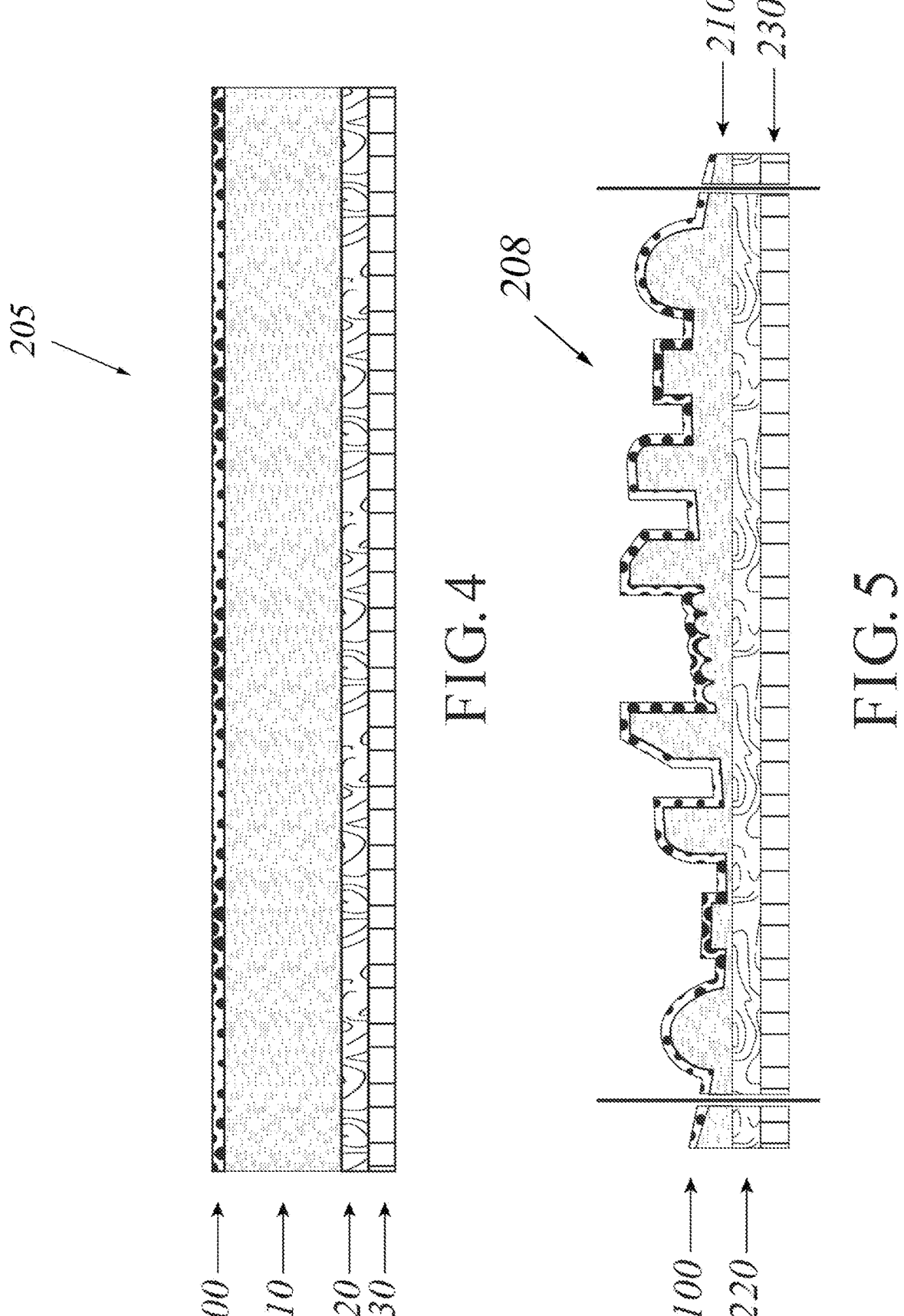
FIG. 4 is a cross sectional view of the 3D emblem 200. The moldable substrate 210 has an adhesive 220 on one face and the digitally printed film 100 on the other face. The adhesive 220 may or may not have a release layer 230 on the other side of the adhesive.
FIG. 5 is a cross sectional view of all the layers after preheating and pressing in a mold. The layers are heated to a temperature that will allow permanent compression of the moldable substrate 210. The heated layers are placed in a room temperature mold and pressure is applied. The composite structure 200 is then removed from the mold and allowed to cool. A chill roller may be used to cool samples that are produced using an embossing roller.

In an embodiment, the present method generally comprises printing a digital image onto one side of a sheet or roll-fed film 100 to create a digitally printed film 100 as seen in FIG. 2. After printing, the method combines the digitally printed film 100 with a moldable substrate 210 having an adhesive backing 220, to yield an unprofiled multi-layer composite 205 as shown in FIG. 4. The unprofiled composite 205 is then heated and placed film 100 first into a room temperature profiled mold 300 as shown in FIG. 3, and pressure is applied to impart a 3D profile as seen in FIG. 5. The now profiled composite 208 is then digitally cut and the undesired areas are removed to produce a durable and stretchy 3D multi-color photographic quality print emblem 200 for the apparel and soft goods industry.

Referring initially to the drawings, FIG. 2 illustrates a digitally printed film 100. The digitally printed film 100 preferably a thermo-plastic hot melt adhesive layer 110 optionally coated with an ink receptive layer 120, and then digitally printed with one or more images 130 as per above configured to define one or more graphics and/or text. In addition, a protective layer 140 comprising a polymeric coating may be applied on the surface of the printed images 130. Thermo-plastic layer 110 is a suitable polymeric thermo-plastic film upon which all remaining layers 120-140 of the printed film 100 are supported and transferred and adhered to the moldable substrate 210. One skilled in the art will understand that there are various suitable polymeric thermo-plastic films that will suffice, the most common including polystyrene, polyolefin, polyester, polyamide and polyurethane, and any suitable thermoplastic or thermo-softening plastic film capable of completing a foam-to-film bond will suffice for thermo-plastic layer 110. In addition, thermo-plastic layer 110 may comprise titanium dioxide ($TiO_2$) reinforcing nanoparticles. The thermo-plastic layer 110 of the present invention preferably has a first melt point within a range of between 120 C and 180 C and most preferably at least 20 degrees greater than the second melt point described below, and preferably at least 20 degrees less than the compression melt point. In an alternate embodiment the thermo-plastic layer 110 is multi-layered with layers of graduated melt temperatures, so that the side facing the ink receptive layer 120 melts at a higher temperature than the face against the moldable substrate 210.

As seen in FIG. 4, the digitally printed film 100 is stacked onto a moldable substrate 210 that has an underlying adhesive backing 220 and optional release layer 230 on the opposite side of adhesive backing 220. The moldable substrate 210 is a polymeric foam that can be permanently compressed at higher temperatures, allowing for permanent profiling in the mold 300 (FIG. 3). This "compression temperature" is higher than the "first melt temperature" required to melt the thermo-plastic layer 110 in the digitally printed film 100 and the "second melt temperature" required to melt the adhesive layer 220 underlying the moldable substrate 210. The combined layers 205, are heated until they reach the required compression temperature at which point they are placed, whilst still hot, into a room temperature mold 300 for pressing. The hot moldable layer 210 compresses within the profiled mold 300 under pressure and permanently takes the shape of the mold 300. While FIG. 3 shows a plate mold 300, one skilled in the art will understand that an embossing roller will also suffice.

The molded emblem 200 is removed from the mold 300 before or after cooling to room temperature. The molded emblem 200 may be digitally cut, or die cut to size, as illustrated by vertical lines in FIG. 5, and the finished emblem 200 is then ready to be used by the customer.

The customer can remove the adhesive release layer 230, if it is present, and place the emblem 200 on the required area of the soft goods. The emblem 200 can then be applied to the soft good either by using a heated press, or a cold press, depending on the adhesive's 220 application requirements. The emblem 200 may be applied using pressure and a second melt temperature that is lower than both the first melt temperature and the compression temperatures of the previous heating steps. In this manner the adhesive 220 can flow into the soft goods to form a strong bond without changing the profile shape of the moldable layer 210.

In use the emblem 200 is applied to the front side or the back side of a clothing article, or even on a tag of the clothing article, or other soft goods, depending on the wants and/or needs of the manufacturer or user and the adhesive layer 220 creates a permanent bond therewith.

The moldable substrate 210 is a suitable material that will compress at high temperatures, for example open cell polyurethane foams, polyester foams, polyamide foam, acrylic foams or EVA foams. This moldable substrate 210 can be as thick as 6 mm in height and can form detailed profiles across the full depth of the moldable layer. The profile is set within this layer 210, and the digitally printed film 100 may be adhered to this layer 210 during the profile forming step since the compression temperature exceeds the first melt temperature required to melt the thermo-plastic layer 110 of the digitally printed film 100, and concurrently causes melt flow of the adhesive 110. The digitally printed film 100 softens and stretches during the profile forming step allowing the ink or toner graphic and/or text images 130 to move with the moldable substrate 210, maintaining the graphics whilst forming to the desired profile. The foam is capable of retaining the embossed/compressed shape whilst maintaining ability to withstand high stretch and recover back to the embossed/compressed shape (compression memory). The cellular nature of the moldable substrate 210 allows cells to collapse and permanently deform, but the remaining structure has pliability by virtue of its cellular structure allowing flexing and further compression. This provides an emblem that is permanently shaped yet retains its pliable nature, allowing further flexing and compression, i.e. the sample is not rigid. For fine detailed profiles or textures a high density microcellular stretchable thermal formable foam is selected, for example, HYPUR-CEL T series or S-Series thermal formable polyurethane foam from Rubberlite, Inc. (Huntington W.Va.) is used. The adhesive layer 220 is a thermoplastic adhesive that can melt flow at a second melt temperature lower than the compression temperature of the moldable substrate 200, preferably within a range of between 90 C and 160 C. This adhesive layer 220 can be a polyester, an acrylic, a polyurethane, polyamide or other suitable adhesives. Alternatively an adhesive 220 that can be applied under pressure at room temperature and maintain adhesion through laundry can also be used (in this case there is no second melt temperature).

The release layer 230 is the substrate layer the adhesive 220 is initially cast onto. This protects the adhesive 220 from contamination until the emblem is applied onto the soft goods, creating the final product. This release layer 230 can be a paper or polymer with release coating, to enable easy release from the adhesive layer. Typical polymers used are PET, BOPP, PP and suitable polymers known in the art. Typical suitable paper stocks are silicone treated papers e.g. Loparex Poly Slik™. The release layer 230 may be removed by the customer prior to application or, removed in the manufacturing process after removal from the mold and complete cooling has occurred.

The digitally printed film 100 inclusive of thermo-plastic adhesive layer 110, ink receptive layer 120, and digitally-printed images 130 may be created as described in co-pending U.S. patent publication no. US20190118575A1.

FIG. 6 is a block diagram summarizing the above-described method of manufacturing the 3D profiled emblem 200.

At step 200 the thermo-plastic adhesive layer 110 is obtained in roll form.

At step 210 the thermo-plastic layer 110 may be processed with the ink receptive pre-treatment 120. For example, see WO2016196267A1 which is a polyurethane base with self-crosslinking acrylic emulsion.

At step 220 the ink receptive treatment 120 or the layer 110 is digitally printed with one or more images 130 configured to define one or more graphics and/or text.

At step 230 polymeric protective layer 140 may be applied over the digitally printed graphic images 130 to yield digitally-printed film 100 as seen in FIG. 2.

At step 240 the printed film 100 is layered onto the composite moldable substrate 205 as seen in FIG. 4 and heat is applied. The temperature of the layers are brought up to the compression temperature that will allow compression of the moldable substrate 210.

At step 250 the heated layers are embossed in a room temperature mold 300 or embossing roller to create a profiled printed 3D emblem.

At step 260 the 3D profiled, printed composite (FIG. 5) is removed from the mold 300 or embossing roller and the non-molded/non-select areas are cut with a laser.

At step 270 the non-select areas are weeded and removed from the 3D emblem to provide a 3D profiled, printed emblem ready to apply to soft goods.

At step 280 the customer removes the adhesive release layer 230, if present, and applies the 3D emblem to soft goods using cold press or heat and pressure, depending on adhesive application requirements.

Given the completed 3D profiled, printed emblem product described above, subsequent application may occur in a separate process where the described 3D profiled, printed emblem is applied to a pliable materials or apparel, which falls in the category of soft goods such as products made from fabric or other pliable or bendable material. Examples include clothing of any type such as shirts, jerseys, and sweatshirts, as well as other products such as banners, flags, covers, bedding, throws, home furnishings, totes, luggage, automotive interiors and other soft goods. Application equipment suitable for this stage or phase can include heat transfer press machines, for example a Stahl Hotronix® STX16 heat-press or a Geo Knight Swing Away® Press.

Thus, the present invention discloses a high resolution 3D profiled, digitally printed emblem and method of making the same. The digitally printed emblem is superior to the prior art by creating a process that can achieve improved stretch, flexibility, and durability and high resolution profiled emblems with graphical sophistication. The resulting embossed profile detail is at least 0.05 mm despite profile changes of up to 6 mm, and is capable of elastic elongation in one direction within a range of from 2% to 75% without cracking, speckling, or otherwise blemishing. In addition, the emblem is robust: capable of undergoing warm wash (40° C.) and medium dryer conditions for at least 5 washes and medium dryer conditions for at least 5 washes.

The method replaces the conventional multipass and injection molding processes, using a sheet or roll-fed process.

Having now fully set forth the preferred embodiments and certain modifications of the concept underlying the present invention, various other embodiments as well as certain variations and modifications of the embodiments herein shown and described will obviously occur to those skilled in the art upon becoming familiar with said underlying concept. It is to be understood, therefore, that the invention may be practiced otherwise than as specifically set forth in the appended claims.

We claim:

1. A sheet or roll-fed process to create a printed flexible and stretchable heat transfer emblem having an embossed relief pattern on one side, comprising the steps of:

coating a stretchable thermo-plastic film with an ink receptive layer;

printing on one side of the stretchable thermo-plastic film using a digital printer to define printed areas and unprinted areas, the thermo-plastic film comprising a hot melt adhesive;

using a sheet or roll-fed process, applying a polymeric protective layer over the printed side of the thermo-plastic film;

using a sheet or roll-fed process, adhering the unprinted side of said thermo-plastic film to a moldable foam substrate by an adhesive-backing on one side of said moldable foam substrate to thereby produce a multi-layer substrate, the adhesive backing comprising a thermoplastic adhesive, wherein the thermo-plastic film comprises layers having graduated melt temperatures such that a side of the thermo-plastic film facing the ink receptive layer melts at a higher temperature than a side of the thermo-plastic film facing the moldable foam substrate;

heating the multi-layer substrate to a compression temperature that allows the polymeric foam to remain compressed after molding;

embossing the multi-layer substrate by placing the printed thermo-plastic film against a mold having a lower temperature than the heated moldable substrate and a surface relief profile until the multi-layer substrate permanently retains the relief profile with profile changes of up to 6 mm and profile details of at least 0.05 mm, the molded multi-layer substrate being capable of elastic elongation in one direction within a range of 2% to 75%;

removing the embossed multi-layer substrate from the mold; and trimming the embossed multi-layer substrate to provide said stretchable emblem having an embossed relief pattern on one side.

2. The process of claim 1, wherein said step of printing on one side of said thermo-plastic film comprises using an inkjet printer.

3. The process of claim 1, wherein said step of printing on one side of said thermo-plastic film comprises using a laser printer.

4. The process of claim 1, wherein said step of printing on one side of said thermo-plastic film comprises printing on said ink receptive coating.

5. The process of claim 1, wherein said thermo-plastic film comprises polyamide, polyurethane or polyolefin configured to bond to foam.

6. The process of claim 1, wherein said thermo-plastic film has a first melt point within a range of between 120 C and 180 C.

7. The process of claim 6, wherein said adhesive-backing on said moldable foam substrate has a second melt point within a range of between 90 C and 160 C.

8. The process of claim 6, wherein said adhesive-backing on said moldable foam substrate has a second melt point within a range of between 100 C and 160 C.

9. The process of claim 8, wherein said moldable foam substrate has a third melt point within a range of between 140 C and 200 C.

10. The process of claim 1, wherein said moldable foam substrate has a third melt point within a range of between 140 C and 200 C.

11. The process of claim 1, wherein said step of embossing the multi-layer substrate comprises placing the printed thermo-plastic film against a mold at room temperature.

12. The process of claim 1, wherein said moldable foam substrate comprises thermal formable polyurethane foam.

13. The process of claim 1, wherein said moldable foam substrate comprises any one from among a group consisting of open cell polyurethane foam, polyester foam, polyamide foam, acrylic foam, or EVA foams.

14. The process of claim 1, wherein said moldable foam substrate is less than or equal to 6 mm thick.

15. A sheet or roll-fed process to create printed flexible and stretchable heat transfer emblem having a three-dimensional surface relief profile, comprising:

coating a thermo-plastic film with an ink receptive layer;

printing onto one side of the thermo-plastic film to define printed areas and unprinted areas, the thermo-plastic film comprising a hot melt adhesive;

using a sheet or roll-fed process, applying a polymeric protective layer over the printed side of the thermo-plastic film;

using a sheet or roll-fed process, adhering the thermo-plastic film to an adhesive-backed moldable substrate to form a multi-layer substrate, the adhesive backing comprising a thermoplastic adhesive, wherein the thermo-plastic film comprises layers having graduated melt temperatures such that a side of the thermo-plastic film facing the ink receptive layer melts at a higher temperature than a side of the thermo-plastic film facing the moldable foam substrate;

heating the multi-layer substrate to a compression temperature at which the moldable substrate can permanently compress;

embossing the multi-layer substrate using a mold having a lower temperature than the heated moldable substrate and a relief profile until the moldable multi-layer substrate takes on the relief profile with profile changes of up to 6 mm and profile details of at least 0.05 mm, the molded multi-layer substrate being capable of elastic elongation in one direction within a range of 2% to 75%;

removing the molded multi-layer substrate from the mold;

cutting the molded multi-layer sub in selected areas;

removing the cut/selected areas to produce a flexible and stretchable emblem having a three- dimensional relief profile on one side.

16. The process of claim 15, wherein said thermo-plastic film comprises $TiO_2$.

* * * * *